March 15, 1966     F. OTTO     3,240,435
PORTABLE APPLIANCES
Filed July 2, 1963     2 Sheets-Sheet 1
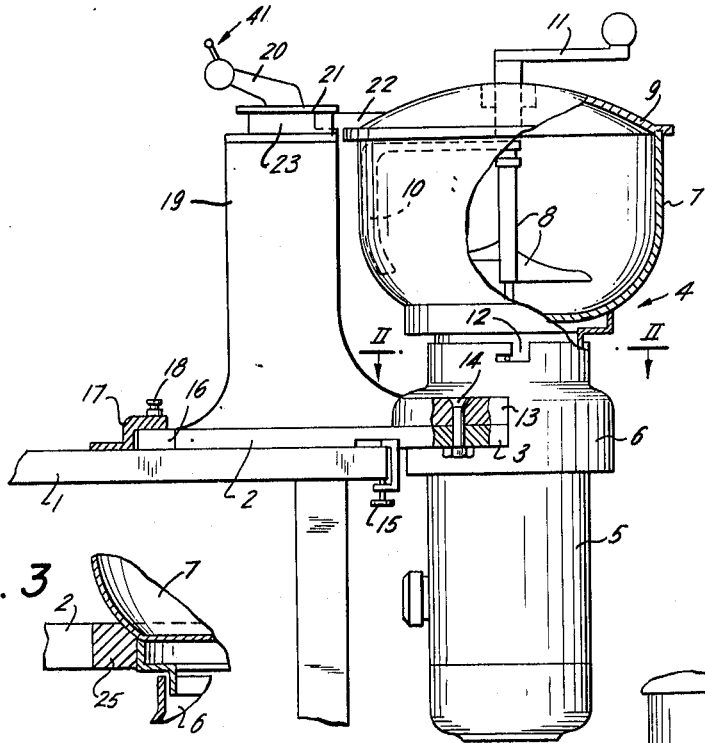
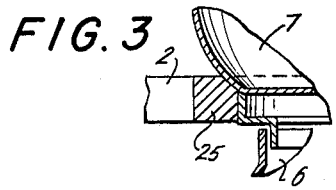
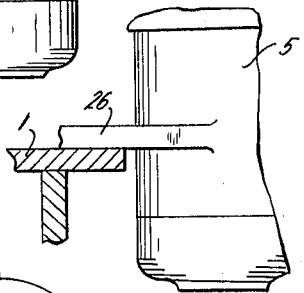
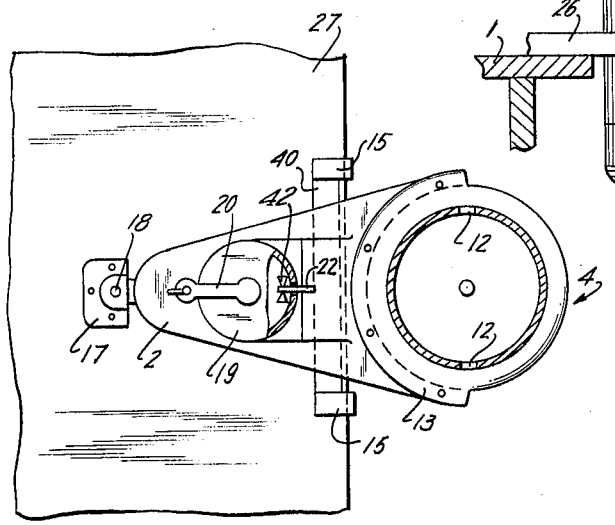
INVENTOR.
Fritz Otto
BY
Michael S. Striker March 15, 1966   F. OTTO   3,240,435
PORTABLE APPLIANCES
Filed July 2, 1963   2 Sheets-Sheet 2

INVENTOR.
Fritz Otto
BY
Michael S. Striker

United States Patent Office 3,240,435
Patented Mar. 15, 1966

3,240,435
PORTABLE APPLIANCES
Fritz Otto, Hameln (Weser), Germany, assignor, by mesne assignments, to Belder Trust reg., Vaduz, Liechtenstein
Filed July 2, 1963, Ser. No. 292,334
Claims priority, application Germany, July 2, 1962, St 14,859
11 Claims. (Cl. 241—101)

The present invention relates to portable appliances, and especially to appliances such as machines for comminuting and mixing materials.

At the present time a particular problem is encountered with the proper mounting of appliances of this type, particularly where the portable appliance is of a substantial size, as is often the case. Thus, if the appliance is designed simply to be placed on a table top, then the result is that the appliance occupies an undesirably large amount of the area of the table top, and quite often the size of the appliance is such that its elevation is too high when placed on a table top. On the other hand, if such an appliance were placed simply on the floor, the appliance would be at an uncomfortably low elevation, and therefore such appliances require special mounting assemblies on which they can be placed so as to be situated at a convenient height for operation of the appliance by the operator.

It is accordingly a primary object of the present invention to provide a portable appliance which can be mounted on a table top or the like in such a way that it will not occupy an undesirably large portion of the area of the table top and also in such a way that the appliance is located at a convenient height so that it can be comfortably operated.

A further object of the present invention is to provide a portable appliance which can be very reliably connected to the table top or the like so as to remain securely connected therewith during operation of the appliance, while at the same time being easily removable from the table top or the like.

Still another object of the present invention is to provide an appliance of the above type which can be attached to any conventional table top or the like without requiring any particular adjustment or positioning of the table top.

It is furthermore an object of the present invention to provide for an appliance of the above type a structure which will guarantee that the appliance will not be operated until a cover has been properly placed on the appliance.

It is furthermore an object of the present invention to provide a structure which is relatively inexpensive to manufacture.

With these objects in view the invention includes, in a portable appliance, a machine, such as a comminuting and mixing machine, for example, and an elongated supporting arm fixed to and extending laterally from the machine and adapted to be placed on a table top so that in this way the machine can be situated adjacent to the table top. A fastening means is operatively connected to this supporting arm for releasably fastening the latter to the table top or the like, so that in this way the machine can be reliably secured to a table top or the like without resting directly on the table top and while at the same time being situated at a convenient elevation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional side elevation of a portable appliance according to the present invention shown in FIG. 1 attached to a table which is fragmentarily illustrated in FIG. 1;

FIG. 2 is a top plan view of the structure of FIG. 1, part of FIG. 2 being shown in section and taken in the section II—II of FIG. 1 in the direction of the arrows;

FIG. 3 is a fragmentary, sectional elevation of a structure which differs from that of FIG. 1 with respect to the manner in which the appliance is connected to the supporting arm therefor;

FIG. 4 is a fragmentary elevation of yet another embodiment of a structure for connecting a supporting arm to a machine;

Figure 5:
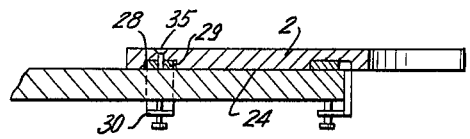
FIG. 5 is a longitudinal sectional illustration of an embodiment different from that of FIGS. 1 and 2 for fastening a supporting arm to a table top.

Referring now to FIG. 1, there is shown therein a table top 1 on which an elongated supporting arm 2 is adapted to be placed in a manner illustrated in FIG. 1. This elongated supporting arm 2 has one free end portion 3 which is fixed with a machine 4, so that the machine 4 together with the supporting arm 2 and the fastening means for fastening the latter to the table top, described below, form the portable appliance which is shown in FIG. 1. The machine 4 in the illustrated example is a comminuting and mixing machine of general utility capable of being used either in the home or in laboratories and capable of comminuting and mixing any chemical materials, foodstuffs, meat, or the like.

It will be seen that the machine 4 includes a lower driving motor 5 adapted to be connected with a suitable source of current through unillustrated leads, and at its upper end the motor 5 is connected with a bearing housing 6 which forms an intermediate portion of the machine 4. The upper end of the machine 4 is formed by a container 7 for the material which is to be comminuted and mixed, and this container 7 is releasably connected with the bearing housing 6 so as to be fastened in this way to the driving motor 5. The drive shaft of the motor 5 is coaxial with the tool 8 which is located within the container 7 and forms a cutter for cutting the material which is placed in the container 7, and the central shaft of the cutter 8 while passing through the bottom wall of the container 7 is releasably connected in a manner well known in the art with the drive shaft of the motor 5 so that the operator can whenever desired disconnect the container 7 from the motor 5, at the bearing housing 6 thereof, and the tool 8 will be removed with the container 7. During operation of the machine the container 7 is closed by a cover 9 connected to the container 7 in any suitable way and serving not only to prevent escape of material in the container 7 from the interior thereof during the comminuting and mixing of this material, but also serving to protect the operator from the rotary tool 8. In addition, the cover 9 turnably supports at a central portion thereof a shaft which is also coaxial with the motor shaft, and this shaft which is supported for rotation by the cover 9 is fixedly connected with a rotary vane 10 which serves to displace the material in the container 7 along the interior thereof when the vane 10 is turned around the central axis of the container 7. For this purpose the shaft which is turnably carried by the cover 9 fixedly carries at the exterior of the latter a manually-operable crank 11 adapted to be manually turned by the operator so that in this way the vane 10 can be manually turned.

For the purpose of releasably connecting the container 7 to the bearing housing 6, this bearing housing 6 is formed with a pair of diametrically opposed bayonet slots 12 of substantially L-shaped configuration, and the container 7 fixedly carries at its lower end an annular portion which extends freely into the upper annular portion of the bearing housing 6 and which carries a pair of diametrically opposed bearing pins which can pass freely downwardly into the bayonet slots 12 and when reaching the bottom ends thereof the container 7 can be turned through a relatively small angle to displace the bayonet pins into the horizontal portions of the slots 12 so that in this way it is possible to releasably fix the container 7 to the bearing housing 6 of the motor 5.

As is apparent from FIG. 1, it is this intermediate portion 6 of the machine 4 which is fixedly connected with the supporting arm 2 which extends laterally from the bearing housing 6 to be placed on the table top 1 and to be releasably fastened thereto in a manner described below, so that in this way it is possible to situate the machine 4 adjacent to the table top 1 at an elevation which makes it convenient for the operator to introduce materials to be treated into the container 7.

The particular construction shown in FIGS. 1 and 2 for fixing the supporting arm 2 to the intermediate portion 6 of the machine 7 includes a flange 13 which is integral with the bearing housing 6 and extends along part of a circle at the exterior thereof. The end portion 3 of the arm 2 is formed with a cutout which has the configuration of part of a circle of the same diameter as that along which the flange 13 extends, and the bearing housing 6 is received within this cutout at the free end portion 3 of the arm 2 with the flange 13 overlapping the arm 2 and with the latter extending beneath the flange 13, as illustrated in FIGS. 1 and 2. The flange 13 and the edge portion of the arm 2 along its arcuate cutout which receives the housing 6 are formed with aligned openings, and each pair of aligned openings receives a bolt 14 the head of which may be countersunk into the flange 13 as shown particularly in FIG. 1, and the bottom threaded ends of the bolts 14 extend downwardly beyond the arm 2 in order to receive nuts for releasably fixing in this way the supporting arm 2 to the bearing housing 6. As a result of this construction according to which the supporting arm 2 forms a separate member which is fixed to the machine 4, it is possible to manufacture the supporting arm 2 separately from the remainder of the structure, and as a result the cost of the structure is considerably reduced.

The structure for fastening the supporting arm 2 to the table top 1 includes a pair of fastening means one of which is operatively connected to the free end portion of the arm 2 which is distant from the machine 4 and the other of which is operatively connected to an intermediate portion of the arm 2 which is adjacent to the machine 4, and this latter fastening means is adapted to connect the arm 2 to the edge 27 (FIG. 2) of the table top adjacent to which the machine 4 is located.

This latter fastening means which is operatively connected to the intermediate portion of the arm 2 includes an elongated bar 40 of substantially rectangular cross section, and this bar 40 extends across the underside of the arm 2. At its underside the arm 2 is formed with an elongated groove whose cross section corresponds closely to the cross section of the bar 40, so that the latter is seated within this groove with the lower face of the bar 40 flush with the underside or lower face of the arm 2. The bar 40 is fixed in any suitable way to the arm 2 as by being threadedly connected therewith with suitable screw members whose heads are countersunk into suitable recesses formed in the bar 40 so that in this way only the lower face of the bar 40 and the bottom face of the arm 2 will engage the table top. As is apparent particularly from FIG. 2 the bar 40 has a pair of free ends respectively located beyond the arm 2, and at these free ends the arm 40 fixedly carries a pair of clamps 15 in the form of C-clamps which extend around the edge 27 of the table top and which threadedly carry at their lower portions screw members adapted to be manually turned into engagement with the underside of the table top so that in this way the intermediate portion of the arm 2 can be releasably fastened with the table top at its edge 27.

The fastening means for the free end portion of the arm 2 which is distant from the machine 4 includes a hollow member 17 which is fixed directly to the table top 1. This hollow member 17 has a bottom flange connected through any suitable screws or the like to the table top, and rising from this bottom flange is a hollow enclosure which is open only at its right-hand end, as viewed in FIGS. 1 and 2, and the free end portion of the arm 2 which is distant from the machine 4 includes an elongated projection 16 integral with the arm 2, or otherwise fixed thereto, and extending into the hollow member 17, in the manner shown in FIGS. 1 and 2. The top wall of the hollow member 17 is formed with a threaded bore receiving a screw 18 which is adapted to be turned by any suitable wrench or the like or by hand so that the bottom end of the screw 18, which may carry a suitable lock nut, for example, presses against the top of the projection 16 for pressing the latter downwardly against the top surface of the table top 1, and in this way the free end portion of the arm 2 can be fastened to the table top 1.

Thus, the pair of fastening means for the free end portion of the arm 2 and the intermediate portion thereof serve to reliably connect the supporting arm 2 with the table top 1 while maintaining the machine 4 adjacent to the table top 1 at a suitable elevation, and at the same time an undesirably large amount of the area of the table top 1 is not occupied by the machine, and of course it is a simple matter to quickly remove the machine from the table or mount it on the table.

The arm 2 may carry, as shown in dotted lines in FIG. 1, a standard 19 which may be hollow so that electrical conductors can pass therethrough, and this standard 19 extends upwardly from the arm 2 alongside of the machine 4 with an upper portion of the standard 19 located at the same elevation as the cover 9. The standard 19 carries at its top end a disc 21 formed, for example, with a groove 23 at its exterior, and this groove 23 may form the outer surface of a ring which is formed with a vertical slot for receiving a flat member 22 which is fixed to and projects laterally from the cover 9. The top of the disc 21 fixedly carries a handle 20 to which a switch 41 is connected, this switch 41 being accessible to the operator for turning the motor 5 on and off and this switch 41 is connected through suitable leads to the motor 5 so that the latter can be turned on or off through actuation of the switch 41. As is shown diagrammatically in FIG. 2, the hollow ring which forms the inner surface of the groove 23 and which is formed with the vertical slot receiving the member 22 defines in its interior a space in which a pair of electrical contacts 42 are situated, these contacts 42 being shown diagrammatically in FIG. 2 and being mounted in any suitable way within the space surrounded by this ring. The contacts 42 are normally spaced from each other, but when the member 22 is passed through the vertical slot of the ring it will bridge the space between and engage the pair of contacts 42, and when the cover 9 is properly placed on the container 7 the portion of the member 22 which engages the pair of contacts 42 completes a circuit therebetween, this portion of the member 22 being electrically conductive and insulated from the remainder of the member 22, if necessary. The contacts 42 are located in the circuit of the motor 5 in such a way that the motor 5 cannot be operated, even if the switch 41 is closed, unless the contacts 42 communicate electrically with each other through the electrically conductive portion of the member 22, and since this electrically conductive portion of the member 22 cannot bridge the contacts 42 unless the cover 9 is properly mounted on the container 7, this construction prevents operation of the machine unless the cover 9 is properly mounted on the container 7, and in this way a safety feature is provided preventing the operator from carrying out any operations with the machine unless the container 7 is properly covered. Thus, the vertical slot formed in the ring located at the bottom of the groove 23 together with the member 22 which is fixed to the cover 9 form a pair of mating portions of a mating means 22, 42 which will prevent operation of the motor 5 unless the mating portions 22 and 42 of the mating means are in proper mating relationship with respect to each other.

In the embodiment of the invention which is fragmentarily illustrated in FIG. 3, the arm 2 is provided at its end portion which is connected to the machine 4 with a ring 25 which receives the container 7 in the manner illustrated in FIG. 3, so that in this embodiment the arm 2 is not fixed with the intermediate portion 6 but instead is in engagement with the container 7 for supporting the machine 4, and otherwise the arm 2 can be fixed to the table top 1 in the manner described above and shown in FIGS. 1 and 2 or in either of the ways described below in connection with FIGS. 5–8. The container 7, from which the motor 5 is suspended by way of the bayonet connection between the container 7 and the bearing housing 6 described above, can simply rest by gravity on the ring 25 in the manner shown in FIG. 3, or any suitable structure may be provided for releasably fixing the container 7 with the ring 25, if desired.

A further possibility for connecting the supporting arm and the machine 4 is illustrated in FIG. 4 according to which the supporting arm 26, which corresponds to the arm 2, is integrally fixed with the outer housing of the motor 5 at an elevation lower than the bearing housing 6 thereof, and this arm 26 can be fixed to the table top 1 in the manner described above in connection with the arm 2 or in the manner described below in connection with FIGS. 5–8. Thus, with this embodiment the motor 5 itself integrally carries a laterally projecting supporting arm 26 capable of being placed on the table top 1 to be releasably fastened therewith. It will be noted that with the embodiment of FIG. 3 the machine 4 will have an elevation somewhat lower than that shown in FIG. 1 while with the embodiment of FIG. 4 the machine will have an elevation somewhat higher than that of FIG. 1. The structure of FIG. 1 is preferred, however, because the height of the machine 4 will be of almost universal suitability to the operators, irrespective of how tall or short they are, and also because of the simplicity of manufacture of the arm 2 which can be manufactured separately from the machine and releasably connected therewith in the manner described above. Thus, it will be seen that with the structure of the invention the machine 4 is mounted at a convenient height so that easy access may be had thereto, while at the same time not only does it require only a small fraction of the space of the table top 1, but in addition the space required by the machine itself is quite small so that the structure of the invention may be used even in situations where there is very little available room. It is also to be particularly noted that the safety structure 22, 42 is situated behind the container 7 out of the way of any operations which might be performed in connection with introducing material into the container 7, for example, and furthermore the safety structure is very well protected against any possible damage because of its situation in the interior of the hollow upper portion of the standard 19. Furthermore, it will be noted that with the structure of the invention the container 7, particularly with the embodiment of FIG. 1, can be removed at any time from the motor 5 by disconnecting the container 7 at its bayonet connection to the bearing housing 6 of the motor 5. Furthermore, it will be seen that the machine of the invention requires very few handles or the like for the purpose of easily mounting the machine on the table 1, and the invention has proved to be particularly suitable for machines where the cutters are driven by motors of 1.5–2kw., and with such a machine the container 7 is situated at an easily accessible height.

The particular arrangement of the supporting arm will be dictated according to the size of the machine, since the arrangement of FIG. 1 or that of FIGS. 3 or 4 will be used, for example, according to that arrangement which will situate the container 7 at the most convenient height.

While the structure of FIGS. 1 and 2 requires the member 17 which is fixed to the table, the embodiments of FIGS. 5–8 do not require such a member 17 and enable the supporting arm 2 to be fastened to any rectangular table or even to a table of another configuration.

Figure 6:
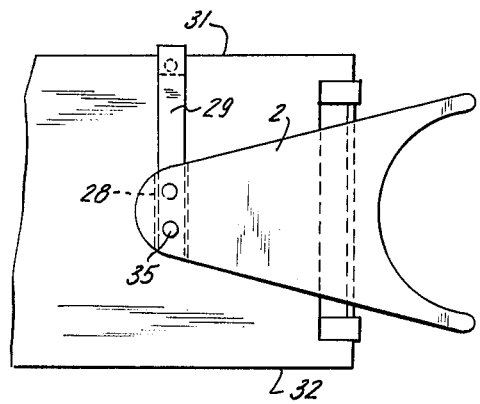
FIG. 6 is a top plan view of the structure of FIG. 5.

Referring to the embodiment of FIGS. 5 and 6, it will be seen that the arm 2 is identical with that of FIGS. 1 and 2 and includes the same fastening means 40, 15 for fastening the intermediate portion of the arm 2 to the edge 27 of the table which is adjacent to the machine 4. However, with the embodiment of FIGS. 5 and 6 the arm 2 is formed at its free end portion which is distant from the machine with a transverse groove 28 extending across the underside of the arm 2 and receiving a bar 29 which is releasably fixed to the arm 2 through a pair of screws 35 which are countersunk into the upper surface of the arm 2 in the manner shown in FIG. 5, and of course the bar 40 of FIG. 2 may be fastened to the arm 2 in exactly the same way. The bar 29 has its bottom face flush with the bottom surface 24 of the arm 2, and this bar 29 extends to the edge 31 of the table and at its outer free end the bar 29 is fixed with a C-clamp 30 or the like enabling the outer free end of the bar 29 to be releasably fixed to the edge 31 of the table, so that in this way it is possible to securely connect the outer free end portion of the arm 2 quickly and reliably to the table. The advantage of this construction is not only that a member such as the member 17 is not required but also that it is easily possible to remove the screws 35 and place the bar 29 in the groove 28 in a position extending from the arm 2 to the edge 32 of the table shown in FIG. 6, and the clamp 30 can now cooperate with this edge 32, the same screws 35 being used to fix the bar 29 to the arm 2 in this latter case, so that with the construction of FIGS. 5 and 6 it is possible to connect the arm 29 to the arm 2 in a position extending in either one of the pair of lateral directions therefrom so as to cooperate either with the edge 31, as shown in FIG. 6, or with the edge 32, and thus according to the requirements of the particular space where the table is located it is possible to provide a highly adaptable structure which can be quickly and easily mounted on the table without requiring any particular adjustment of the table itself so as to enable it to receive the machine.

Figure 7:
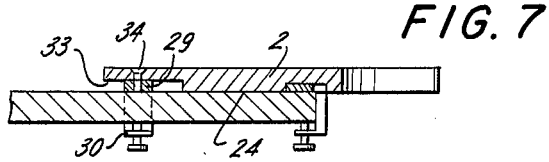
FIG. 7 is a longitudinal sectional elevation of yet another embodiment of a structure for fastening a supporting arm to a table top.
Figure 8:
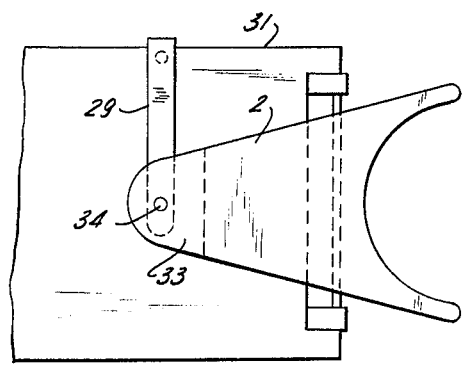
FIG. 8 is a top plan view of the structure of FIG. 7.

The structure of FIGS. 7 and 8 will produce the same results as the structure of FIGS. 5 and 6, although the structure of FIGS. 7 and 8 is slightly more convenient with respect to the positioning of the bar 29 relative to the support 2. Thus, with this construction the bar 29 is pivotally connected to the arm 2 by pivot pin 34, and for this purpose the underside of the arm 2 is formed at its free end with a cutout 33 as indicated in FIGS. 7 and 8 enabling the bar 29 to be swung between the position shown in FIG. 8 to another position where the bar 29 will extend to the edge 32 to which the clamp 30 may be fixed in the manner described above. Thus, with the embodiment of FIGS. 7 and 8 the operator can simply turn the arm 29 to the most convenient position for the particular table and the particular space where the table is situated. Of course, the embodiment of FIGS. 7 and 8 requires a substantial cutout 33 rather than the simple groove 28 and the pair of screws 35 provide a more rigid connection of the arm 29 to the support 2, so that in those cases where a particularly rigid mounting of the arm 2 on the table is considered of greater importance the embodiment of FIGS. 5 and 6 will be preferred, while in those cases where flexibility and adaptability of the structure for connecting the arm 2 to a particular table or to different tables of different configurations is important, the embodiment of FIGS. 7 and 8 will be used.

It will be understood that each of the elements described above, or two or more together, may also find a useful application in other types of appliances differing from the types described above.

While the invention has been illustrated and described as embodied in portable appliances, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constiute essential characteristics of the generic or specific aspects of this invention and, therefore, such adaptations should and are intended to be comprehended within the meaning and range of equivalence of the following claims.

What is claimed as new and desired to be secured by Letters Patent is:

1. A portable appliance comprising, in combination, a comminuting and mixing machine having a lower motor, an upper container adapted to receive material to be comminuted and mixed and containing also a cutter driven by the motor, and an intermediate portion beneath said container adjacent an upper end of said motor, said machine also including a cover to be placed on said container in a position covering the latter; a supporting arm fixed to and extending laterally from said intermediate portion of said machine and adapted to be placed on a table top for positioning the machine adjacent to the table top; fastening means operatively connected to said arm for releasably fastening the same to a table top; a standard carried by and extending upwardly from said supporting arm and located beside said container, said standard having an upper end portion located at the same elevation as said cover when the latter is on said container; and mating means having a portion carried by said standard and a portion carried by said cover and said portions of said mating means having a mating relationship with respect to each other only when said cover is properly placed on said container, said mating means preventing the motor from operating except when said portions of said mating means are in proper mating relationship with respect to each other when said cover is properly placed on said container.

2. A portable appliance comprising, in combination, a machine; an elongated supporting arm fixed to and extending laterally from the machine, said arm being adapted to be placed on a table top for positioning the machine adjacent the table top, said arm having a free end portion distant from the machine and an intermediate portion adjacent the machine; first fastening means operatively connected only with a table top and with said free end portion of said arm for releasably fixing said arm at said free end portion to a table top in cantilever fashion and removable from said first fastening means only by movement in a predetermined direction; and second fastening means operatively connected to said arm at said intermediate portion thereof for releasably fixing said intermediate portion of said arm to an edge of a table top in a position preventing movement of said arm in said predetermined direction, so that said arm may be removed from said first fastening means by movement in said predetermined direction only after release of said second fastening means.

3. A mounting assembly for mounting a portable machine on a table top, said assembly comprising, in combination, an elongated, substantially flat supporting arm having one free end portion adapted to be fixed with a machine or the like and an opposite free end portion distant from the machine, said arm having an intermediate portion between said free end portions thereof; and a pair of fastening means respectively operatively connected to said intermediate portion and opposite free end portion of said arm, said fastening means for said opposite free end portion being operatively connected only to said table top and said opposite free end portion in cantilever fashion, said opposite free end portion being removable from said fastening means for said opposite free end portion only by movement in a predetermined direction for releasably fastening the latter to a table top, and the fastening means which is operatively connected to said intermediate portion of said arm releasably fastening the latter to an edge of a table top in a position preventing movement of said arm in said predetermined direction, so that said arm may be removed from said fastening means for said opposite free end portion by movement in said predetermined direction only after release of said fastening means for said intermediate portion.

4. A portable appliance comprising, in combination, a machine; an elongated supporting arm fixed to and extending laterally from the machine, said arm being adapted to be placed on a table top for positioning the machine adjacent the table top, said arm having a free end portion distant from the machine and an intermediate portion adjacent the machine; first fastening means adapted to be operatively connected with said free end portion of said arm for releasably fixing said arm at said free end portion to a table top; and second fastening means operatively connected to said arm at said intermediate portion thereof for releasably fixing said intermediate portion of said arm to an edge of a table top, said second fastening means including an elongated bar extending across said intermediate portion of said arm at an underside thereof, said arm being formed at said underside with an elongated groove receiving said bar and the latter having a lower surface flush with the underside of said arm, said bar having free end portions respectively located beyond said arm, and said second fastening means further including a pair of clamps connected to said free end portions of said bar for clamping the latter to an edge of a table top, said bar being fixed with said arm.

5. A portable appliance comprising, in combination, a machine; an elongated supporting arm fixed to and extending laterally from the machine, said arm being adapted to be placed on a table top for positioning the machine adjacent the table top, said arm having a free end portion distant from the machine and an intermediate portion adjacent the machine; first fastening means adapted to be operatively connected with said free end portion of said arm for releasably fixing said arm at said free end portion to a table top; said first fastening means including a hollow member fixedly carried by a table top and receiving in its interior said free end portion of said arm, said hollow member carrying a screw member for engaging said free end portion of said arm and releasably fastening the latter to the table top in the interior of said hollow member; and second fastening means operatively connected to said arm at said intermediate portion thereof for releasably fixing said intermediate portion of said arm to an edge of a table top.

6. A mounting assembly for mounting a portable machine on a table top, said assembly comprising, in combination, an elongated, substantially flat supporting arm having one free end portion adapted to be fixed with a machine, and an opposite free end portion distant from the machine, said arm having an intermediate portion between said free end portions thereof; and a pair of fastening means respectively operatively connected to said intermediate portion and opposite free end portion of said arm for releasably fastening the latter to a table top, the fastening means which is operatively connected to said intermediate portion of said arm releasably fastening the latter to one edge of a table top, and including an elongated bar extending across said arm at an underside thereof, said arm being formed at said underside with an elongated cutout receiving said bar and the latter having a bottom face flush with the underside of said arm, said bar having a pair of opposed free ends respectively located beyond said arm, and said fastening means connected to said intermediate portion of said arm further including a pair of clamps carried by said free ends of said bar for releasably clamping the latter to another edge of the table top, said bar being fixed to said arm.

7. A mounting assembly for mounting a portable machine on a table top, said assembly comprising, in combination, an elongated, substantially flat supporting arm having one free end portion adapted to be fixed with a machine, and an opposite free end portion distant from the machine, said arm having an intermediate portion between said free end portions thereof; and a pair of fastening means respectively operatively connected to said intermediate portion and opposite free end portion of said arm for releasably fastening the latter to a table top, the fastening means which is operatively connected to said intermediate portion of said arm releasably fastening the latter to an edge of a table top, and the fastening means which is operatively connected to said opposite free end portion of said arm including a hollow member fixed to a table top and receiving the free end portion of said arm, said opposite free end portion of said arm including a projection extending into said hollow member, and hollow member carrying a fastening member in the form of a screw which engages said projection for releasably fixing said opposite free end portion of said arm to the table top.

8. A mounting assembly for mounting a portable machine on a table top, said assembly comprising, in combination, an elongated substantially flat supporting arm having one free end portion adapted to be fixed to a machine, and an opposite free end portion distant from the machine, said arm having an intermediate portion between said free end portions thereof; and a pair of fastening means respectively operatively connected to said intermediate portion and opposite free end portion of said arm for releasably fastening the latter to a table top, the fastening means which is operatively connected to said intermediate portion of said arm releasably fastening the latter to one edge of a table top, and said fastening means which is operatively connected to said opposite free end portion of said arm including an elongated bar connected to said arm in a position flush with the underside thereof and extending from said arm to an other edge of the table top, said bar carrying at its ends distant from said arm a clamp for releasably clamping said bar to said other edge of the table top.

9. A portable appliance comprising, in combination, an elongated machine including a food-processing device and a motor arranged downwardly of said food-processing device for operating the same; an elongated supporting arm fixed to said elongated machine in a region thereof located under said food-processing device, and above said motor and extending laterally from said machine, said arm being adapted to be placed on a table top for positioning said machine adjacent said table top and having a free end portion distant from said machine and an intermediate portion adjacent said machine; first fastening means located at said free end portion of said arm for releasably fixing said arm and said machine carried thereby to said table top in cantilever fashion and with said food-processing device located above and said motor located below the level of said table top; and second fastening means located at said intermediate portion of said arm for releasably securing said intermediate portion of said arm to said table top, whereby said machine is releasably supported laterally of said table top, with said food-processing device located above and said motor located below the level of said table top.

10. A portable appliance comprising, in combination, an elongated machine including a food-processing device having a bottom portion and a motor arranged downwardly of said food-processing device for operating the same; an elongated supporting arm fixed to and extending laterally from said machine, said arm being adapted to be placed on a table top for positioning said machine adjacent said table top with said bottom portion of said food-processing device substantially at the level of said table top and said motor disposed below the level of said table top, said arm having a free end portion distant from said machine and an intermediate portion adjacent said machine; first fastening means adapted to be operatively connected with said free end portion of said arm for releasably fixing said arm and said machine carried thereby to said table top in cantilever fashon; and second fastening means operatively connected to said arm at said intermediate portion thereof for releasably securing said intermediate portion of said arm to said table top, thereby releasably supporting said machine laterally of said table top, with said bottom portion of said food-processing device positioned substantially at the level of said table top and with said motor positioned below said level, whereby vibrations occurring during operation of said machine will be attenuated.

11. A portable appliance adapted to be positioned adjacent a table top having an upper surface and an edge portion and comprising, in combination, an elongated machine including a food-processing device having a bottom portion and a motor arranged downwardly of said food processing device for operating the same; an elongated supporting arm fixed to and extending laterally from said machine, said arm being adapted to be placed on said upper surface of said table top for positioning said machine adjacent said edge portion of said table top laterally of the latter with said bottom portion of said food-processing device substantially at the level of said upper surface and said motor disposed below the level of said upper surface, said arm having a free end portion distant from said machine and an intermediate portion adjacent said machine; first fastening means adapted to be operatively connected with said free end portion of said arm remote from said edge portion of said table top for releasably fixing said arm to said table top in cantilever fashion; and second fastening means operatively connected to said arm at said intermediate portion thereof for releasably securing said intermediate portion of said arm at said edge portion of said table top, thereby releasably supporting said machine laterally of said table top with said bottom portion of said food-processing device positioned substantially at the level of said upper surface of said table top, and with said motor positoned below said level, whereby vibrations occurring during operation of said machine will be attenuated and said food-processing device will be located at a height comfortable for an operator.

References Cited by the Examiner

UNITED STATES PATENTS

| | | | |
|---|---|---|---|
| 86,484 | 2/1869 | Winkler | 241—285 X |
| 377,762 | 2/1888 | Kane | 241—257 X |
| 1,724,598 | 8/1929 | Johnston | 146—67 |
| 2,071,730 | 2/1937 | Coventry | 241—285 X |
| 2,394,459 | 2/1946 | Markowitz | 241—285 X |
| 2,511,357 | 6/1950 | Marty | 146—76 |

FOREIGN PATENTS

| | | |
|---|---|---|
| 510,554 | 9/1920 | France. |
| 149,927 | 3/1904 | Germany |
| 198,091 | 5/1908 | Germany. |
| 202,204 | 9/1908 | Germany. |
| 615,424 | 7/1935 | Germany. |

ROBERT C. RIORDON, *Primary Examiner.*

WILLIAM W. DYER, Jr., J. SPENCER OVERHOLSER,
*Examiners.*